United States Patent
Yasuda et al.

(10) Patent No.: US 8,363,933 B2
(45) Date of Patent: Jan. 29, 2013

(54) IMAGE IDENTIFICATION METHOD AND IMAGING APPARATUS

(75) Inventors: Yasuyo Yasuda, Fujisawa (JP); Tetsuya Hamada, Yokohama (JP); Takashi Suzuki, Yokohama (JP); Masaki Hiraga, Tokyo (JP); Yasushi Tanase, Tokyo (JP); Toshiki Shiino, Tokyo (JP)

(73) Assignees: Morpho, Inc., Tokyo (JP); NTT DoCoMo, Inc., Tokyo (JP)

( * ) Notice: Subject to any disclaimer, the term of this patent is extended or adjusted under 35 U.S.C. 154(b) by 717 days.

(21) Appl. No.: 12/462,869

(22) Filed: Aug. 11, 2009

(65) Prior Publication Data

US 2010/0142807 A1 Jun. 10, 2010

(30) Foreign Application Priority Data

Aug. 13, 2008 (JP) ................................. 2008-208407

(51) Int. Cl.
*G06K 9/00* (2006.01)
*G06K 9/34* (2006.01)

(52) U.S. Cl. ........................................ 382/164; 382/173

(58) Field of Classification Search .................. None
See application file for complete search history.

(56) References Cited

U.S. PATENT DOCUMENTS

| | | | |
|---|---|---|---|
| 6,195,459 B1 * | 2/2001 | Zhu | 382/176 |
| 6,301,440 B1 | 10/2001 | Bolle et al. | |
| 6,549,660 B1 * | 4/2003 | Lipson et al. | 382/224 |
| 7,894,673 B2 * | 2/2011 | Takemoto | 382/190 |
| 2002/0122596 A1 * | 9/2002 | Bradshaw | 382/226 |
| 2003/0128874 A1 * | 7/2003 | Fan | 382/170 |
| 2005/0220341 A1 * | 10/2005 | Akahori | 382/170 |
| 2007/0031035 A1 * | 2/2007 | Hovden | 382/170 |
| 2008/0137954 A1 * | 6/2008 | Tang et al. | 382/176 |
| 2009/0207281 A1 * | 8/2009 | Ono | 348/234 |
| 2010/0111416 A1 * | 5/2010 | Meiers | 382/170 |

FOREIGN PATENT DOCUMENTS

| | | |
|---|---|---|
| JP | 06-231254 | 8/1994 |
| JP | 07-222175 | 8/1995 |
| JP | 2000-099727 | 4/2000 |
| JP | 2000-115557 | 4/2000 |
| JP | 2001-005967 | 1/2001 |
| JP | 2001-145604 | 5/2001 |

(Continued)

OTHER PUBLICATIONS

Szummer et al., "Indoor-Outdoor Image Classification", ICCV 1998.*

(Continued)

*Primary Examiner* — Li Liu
(74) *Attorney, Agent, or Firm* — Muramatsu & Associates

(57) ABSTRACT

An image identification method for classifying block images of input image data into one of predetermined categories; the method includes the steps of: dividing image data into multiple blocks to produce block images, processing the feature quantity of each block image by their color space information and frequency component, learning separating hyperplanes that indicate boundaries of each category by reading in training data image that have labeled categories for each block and processing image feature quantity for each block of an training data image, and classifying respective block image to a category according to the distance from the separating hyperplane of each category for a newly acquired image to obtain the image feature quantity of block images. An imaging apparatus implementing the image identification method noted above is also disclosed.

6 Claims, 19 Drawing Sheets

FOREIGN PATENT DOCUMENTS

| | | |
|---|---|---|
| JP | 2002-183145 | 6/2002 |
| JP | 2002-312796 | 10/2002 |
| JP | 2004-030188 | 1/2004 |
| JP | 2006-268820 | 10/2006 |
| JP | 2007-081681 | 3/2007 |
| JP | 2007-184733 | 7/2007 |
| WO | WO 2006/090731 | 8/2006 |

OTHER PUBLICATIONS

Serrano et al. "A Computationally Efficient Approach to Indoor/Outdoor Scene Classification", IEEE 2002, pp. 146-149.

Permuter et al. "A study of Gaussian mixture models of color and texture features for image classification and segmentation", 2005 Pattern Recognition Society, pp. 695-706.

* cited by examiner

FIG.7

IMAGE FEATURE QUANTITY DATA

IMAGE ID : ○○○○

| BLOCK NO.1 |
|---|
| BLOCK NO.2 |
| ⋮ |
| BLOCK NO.1024 |

| FEATURE QUANTITY | COLOR COMPONENT | LAYER | VARIABLE | EXAMPLE DATA |
|---|---|---|---|---|
| FREQUENCY OF OCCURRENCE | Y | 0 | x1 | 0.0136719 |
| | | 1 | x2 | 0.108398 |
| | | 2 | x3 | 0.210938 |
| | | 3 | x4 | 0.375 |
| | | 4 | x5 | 0.249023 |
| | | 5 | x6 | 0.0400391 |
| | | 6 | x7 | 0.00292969 |
| | U | 0 | x8 | 0.308594 |
| | | 1 | x9 | 0.171387 |
| | | 2 | x10 | 0.019043 |
| | | 3 | x11 | 0.000976563 |
| | | 4 | x12 | 0 |
| | | 5 | x13 | 0 |
| | | 6 | x14 | 0 |
| | V | 0 | x15 | 0 |
| | | 1 | x16 | 0 |
| | | 2 | x17 | 0 |
| | | 3 | x18 | 0 |
| | | 4 | x19 | 0 |
| | | 5 | x20 | 0.00390625 |
| | | 6 | x21 | 0.181152 |
| STANDARD DEVIATION BETWEEN PIXELS | Y | | x22 | 1.06287 |
| | U | | x23 | 0.499418 |
| | V | | x24 | 0.384971 |
| FREQUENCY COMPONENT | | 1 | x25 | 0.417831 |
| | | 2 | x26 | 0.0692139 |
| | | 3 | x27 | 0.0947266 |
| | | 4 | x28 | 0.105118 |
| | | 5 | x29 | 0.113449 |
| | | 6 | x30 | 1.20396 |
| | | 7 | x31 | 0.733147 |
| | | 8 | x32 | 0.820381 |
| FREQUENCY COMPONENT BIAS RATIO X:Y | | | x33 | 0.213226 |

FIG.8

DISTANCE DATA FROM SEPARATING HYPERPLANE

IMAGE ID:OOOO

| BLOCK NO.1 |
|---|
| BLOCK NO.2 |
| ⋮ |
| BLOCK NO.1024 |

| CATEGORY | DISTANCE |
|---|---|
| MOUNTAIN | + 1.2343 |
| SEA | − 0.6565 |
| SKY | + 0.8970 |
| ⋮ | |

FIG.9

CATEGORY DATA

IMAGE ID: ○○○○

| BLOCK NO. | CATEGORY | GROUP NO. |
|---|---|---|
| 1 | MOUNTAIN | 1 |
| 2 | MOUNTAIN | 1 |
| 3 | MOUNTAIN | 1 |
| 4 | SKY | 2 |
| 5 | SEA | 3 |
| 6 | MOUNTAIN | 4 |
| ⋮ | | |
| 1024 | SEA | 3 |

BLOCK CATEGORY CORRECTION ROUTINE

CORRECTION THRESHOLD TABLE

| CATEGORY | DISTANCE FROM SEPARATING HYPERPLANES |
|---|---|
| MOUNTAIN | + 0.5454 |
| SEA | + 1.2231 |
| ⋮ | |

LOCK GROUP CONSISTENCY DETERMINATION ROUTINE

FIG.14

| CONDITION NO. | CATEGORY | INCLUSIVE CONDITION | LOCATION CONDITION | |
|---|---|---|---|---|
| | | | UPPER | LOWER |
| 1 | SEA | SKY | | |
| 2 | SKY | | SEA | MOUNTAIN |
| ⋮ | | | | |

FIG.16

| CATEGORY | PARAMETERS | | | |
|---|---|---|---|---|
| | MODE | ISO SENSITIVITY | SHUTTER SPEED | ... |
| SKY | AUTO | | | |
| SUNSET | | | SLOW | |
| MOUNTAIN | AUTO | | | |
| ⋮ | | | | |

FIG.17

| CATEGORY | COMPENSATION PROCESS |
|---|---|
| SKY | COLOR COMPENSATION |
| SUNSET | BACKLIGHT RECOGNITION |
| MOUNTAIN | CONTOUR ENHANCEMENTS COLOR COMPENSATION |
| ⋮ | |

FIG.20
(a)
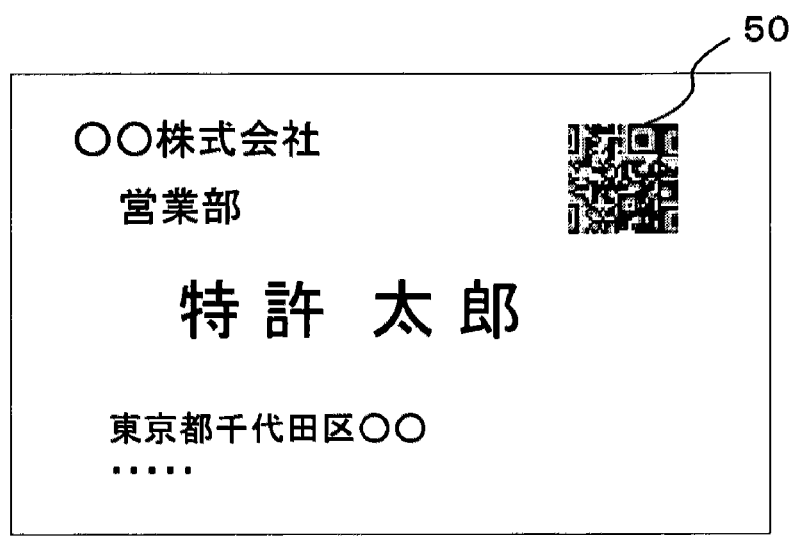
(b)
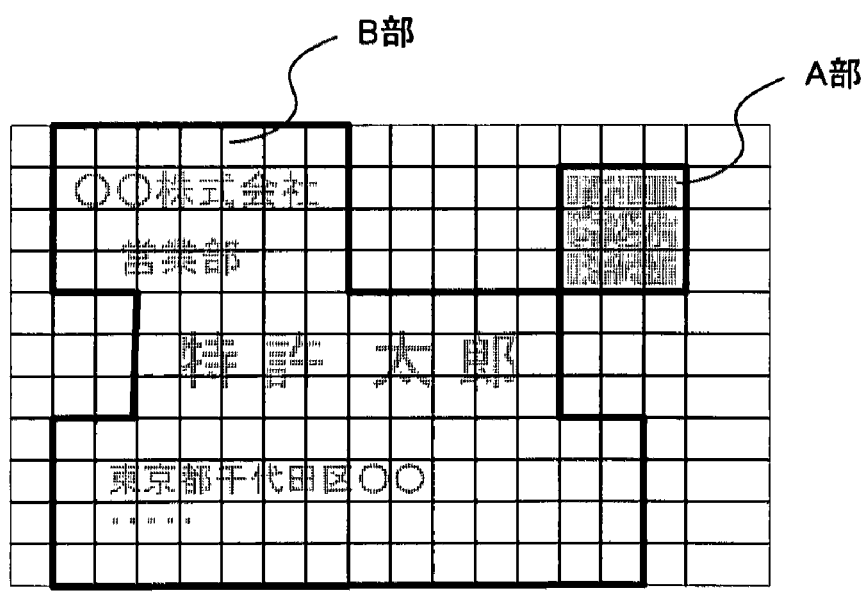

IMAGE IDENTIFICATION METHOD AND IMAGING APPARATUS

This application claims the benefits of foreign filing priority based on Japanese Patent Application No. 2008-208407 filed Aug. 13, 2008, the entire contents of which are incorporated herein by reference.

BACKGROUND OF THE INVENTION

1. Field of the Invention

The present invention relates to a technology of specifying an object (category) in an image. Especially it relates to an image identification method and an imaging apparatus which enables appropriate camera settings through very accurate scene detection such as of landscape during image capturing.

2. Description of the Related Art

With the proliferation of digital cameras and camera phones, opportunities for users to capture images of various scenes using these devices are ever increasing. In these scenes, higher quality photographs can often be captured by recognizing the subject and configuring camera parameters accordingly.

In Japanese Unexamined Patent Application Publication No. 2007-184733, an image processing device is proposed to estimate the camera mode that will most likely be used by the photographer according to information such as time of camera's internal clock, thermometer, or information from a GPS image, and this estimated camera mode is disclosed to the photographer.

Also proposed in this document is a method to estimate the image capturing scene according to subject recognition and subject type.

SUMMARY OF THE INVENTION

However, embedding image processing device of Publication No. 2007-184733 noted above into existing camera modules is difficult since information used to estimate the camera mode requires hardware such as sensors and GPS. Also, it is difficult to overcome the physical- or cost-related restrictions when embedding the device into compact digital cameras or camera phones.

Meanwhile, common subject recognition technologies include contour recognition based on template matching or feature point extraction. However, when recognizing landscape such as mountains or skies, humans would recognize them as landscape (hereinafter referred to as "landscape subject"), but they are difficult to recognize accurately since landscape subject do not contain subjects with specific shapes. Also, another issue is that template data becomes too large when attempting to comply with all patterns.

The present invention was made in view of the above issue. The object of this invention is to provide an image identification method and an imaging apparatus where image capturing scene classification is possible solely through software image processing without necessitating hardware configuration, further, a landscape subject can be recognized quite accurately without the use of large number of templates.

In order to achieve the object, there is provided according to an aspect of the present invention with its image identification method for classifying block images of input image data into one of the multiple predetermined categories according to feature quantity in each block image, including an image production step of dividing image data into multiple blocks to produce block images, an image feature quantity processing step of processing the feature quantity of each block image by their color space information and frequency component, a separating hyperplane processing step of learning separating hyperplanes that indicate boundaries of each category by reading in training data image that have labeled categories for each block and processing image feature quantity for each block of an training data image, and a category classification step of classifying respective block image to a category according to the distance from the separating hyperplane of each category by executing the block image production step and the image feature quantity processing step for a newly acquired image to obtain the image feature quantity of block images.

This invention determines a category by using not only the color space information but also the frequency component of a block image and using them as feature quantity along with the distance from separating hyperplane previously acquired from a training data.

Namely, image category for each block of a newly acquired image is determined based on the separating hyperplane data that are processed for each category for their image feature quantity space where a sample image where each block is categorized is used as a training image.

Preferably, the image feature quantity processing step should divide a block image into multiple layers based on the color space, detects the frequency of occurrence for each layer while processing the pixel standard deviations within a block, divide block image further into multiple smaller blocks, calculates frequency component that indicates change in brightness of each smaller block, process the bias of the frequency component in at least one of horizontal direction and vertical direction for each block where the smaller block belongs based on frequency component thereof, and process as image feature quantity the frequency of occurrence, the pixel standard deviation, the frequency component and the frequency component bias.

Highly accurate identification under the controlled number of block division is made possible by not only using color components of block images but also the frequency component bias within a block.

According to another aspect of the present invention, an image identification method further stores inconsistent conditions between categories, changes the block image category of a newly acquired image based on this inconsistent condition and categories of surrounding block images, then groups together blocks of neighboring blocks of the same category, then for each grouping of blocks determines the validity of its category classification based on its inconsistent conditions in the consistency checking step.

These inconsistent conditions can be for a block image unit or a group of block images. For example, if only one block differs in its category from the surrounding blocks, then match the category with the surrounding blocks. In this case, a more accurate compensation is made possible by adding the condition of the distance from the separating hyperplane where if the positive distance from the separating hyperplane is large, then do not change the category.

Inconsistent conditions against a group of blocks are conditions that judge inconsistency of the physical relationship such as the "sea" being above the "sky".

And the category of the block group estimated to be valid is outputted as a result of this consistency checking step. This makes highly accurate category classification possible for a group of blocks.

By utilizing the above image feature quantity, a fixed number of blocks will still provide very accurate classification, however category classification can be made more accurately by dividing blocks that are on the border of different categories into smaller blocks to determine their category classifications. Image processing can be efficiently performed by detecting an edge or a corner on the boundary of block groups of different categories.

According to another aspect of the present invention, an imaging apparatus identifies image category with the above image identification method, and it includes an imaging condition storage unit to memorize the parameters for each category of the imaging apparatus and image processing methods after capturing the image, an imaging unit to set parameters of the imaging apparatus according to the category of subject output by the image identification method when capturing an image and to acquire a captured image, and an image processing unit to execute image processing by image processing methods corresponding to the category of the captured image.

This invention sets camera parameters (such as automatic/manual mode, shutter speed, and exposure time) and then captures an image appropriate for a category as determined by the category classification result obtained from a "preview" image, then performs image processing (such as contour enhancements and color compensation) on the captured image. Also, camera user's image capturing mode selection can be aided by displaying the ideal image capturing mode to the user by determining the category classification result for an image.

According to another aspect of the present invention, the imaging apparatus identifies an image category using the above image identification method and it includes a program storage unit to store programs that are to be executed with relation to a category, a program selection unit to select a program related to the category identified by the image identification method if the program storage unit is storing the program, and a program execution unit to execute the program selected by the program selection unit.

This invention simplifies operation and/or makes it more efficient through automatically starting up a program or displaying it on a monitor to let the user select its use according to the category as determined by the image identification method.

According to the present invention, very accurate category classification is made possible for even an image subject lacking specific shapes such as landscapes where template matching is not effective, this is due to image feature quantity consisting of color space information and frequency component, and training data is used in advance to calculate the separating hyperplanes according to image feature quantity of each category, and then category of each image block is determined for an image to be classified by the distance from separating hyperplanes of each category by using feature quantity of each block.

BRIEF DESCRIPTION OF THE DRAWINGS

FIG. 7 is a data structure example for FIG. 2 feature quantity data.

FIG. 8 is a data structure example for FIG. 2 hyperplane data.

FIG. 9 is a data structure diagram for FIG. 2 result file.

FIG. 14 is an inconsistent conditions table used in the FIG. 13 process.

FIG. 16 is an example parameter table data equipped in parameter configuration unit 3 of FIG. 15.

FIG. 17 is an example data for a compensation process table equipped in image processing unit 6 of FIG. 15.

FIG. 20 is an explanatory diagram of block groups for each category according to the third embodiment of this invention.

DESCRIPTION OF THE PREFERRED EMBODIMENTS

Figure 1:
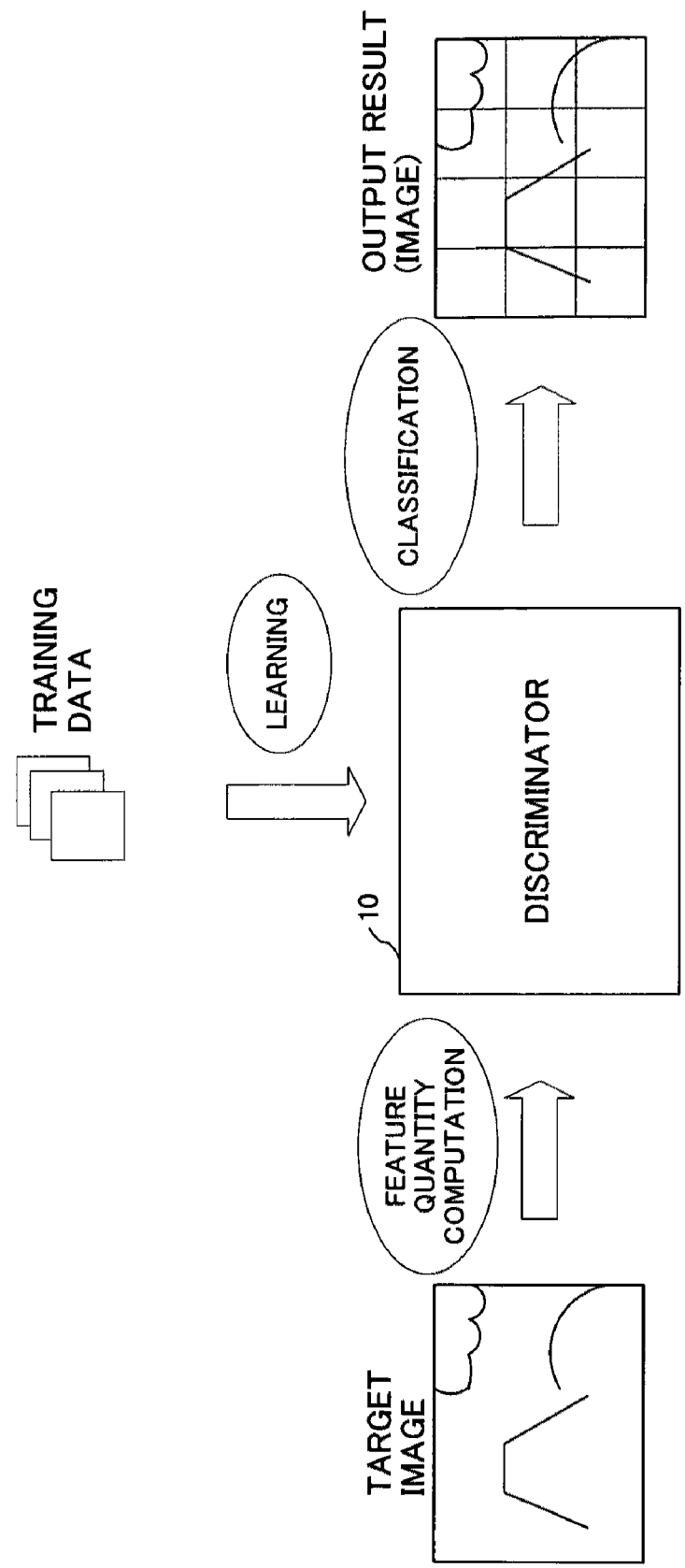
FIG. 1 is a general explanatory drawing of the discriminator which realizes image identification method of an embodiment of this invention.

Preferred embodiments in accordance with this invention will be described below. FIG. 1 is a general explanatory drawing of a discriminator to realize the image identification method of this embodiment. Here, the example used in the explanation divides a landscape subject into the following 6 categories: mountain(s), sky, sea, fall foliage, sunset, and cherry blossom(s). However, this invention is not restricted to these categories.

Discriminator 10 in FIG. 1 consists of general purpose computer system, which first accepts an input image and divides the input image into blocks. Then, the discriminator 10 calculates the image feature quantity for each block according to below, and classifies the landscape subject, or determines it as unknown, for each block and outputs the resulting classification.

Discriminator 10 will be given, as training data, image blocks with correct labels of their landscape subject to learn the classification method.

For example, the classification method computes the separating hyperplane by inputting image feature quantity for each category by using liblinear which contains a learning algorithm in the widely used linear SVM library. The classification method stores the result, then obtains the image feature quantity of the newly acquired target image (hereinafter referred to as "target image"), and determines that the category for a block is the one for the largest positive value for the distance calculated for each category from its separating hyperplane.

Configuration and operation of discriminator 10 is described below.

Figure 2:
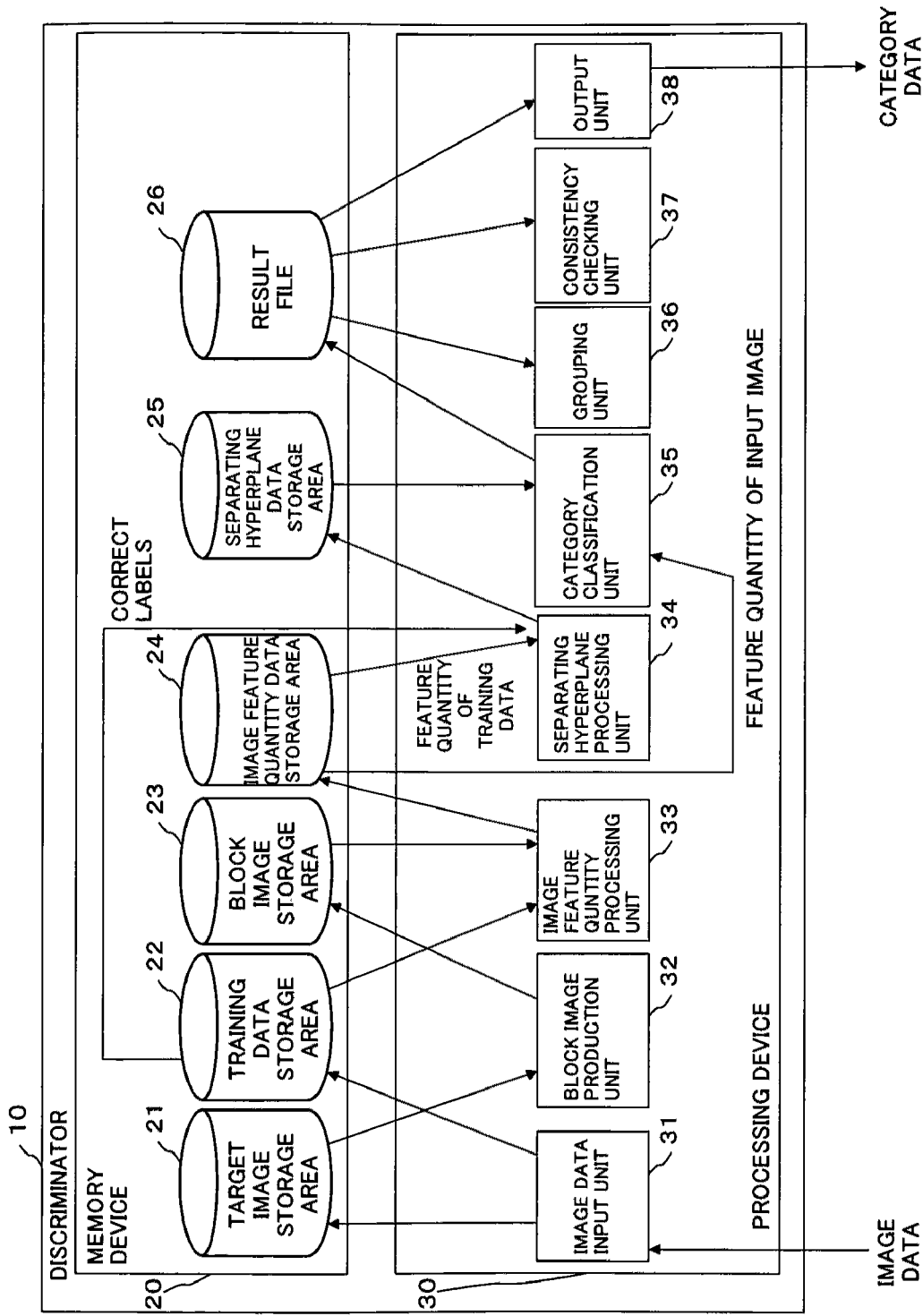
FIG. 2 is a functional block diagram of discriminator 10 in the first embodiment of this invention.

FIG. 2 is a functional block diagram of discriminator 10 of this embodiment. Here, discriminator 10 includes memory device 20 to store data and processing device 30 to execute computational process. Processing device 30 includes image data input unit 31 to store input image data into memory device 20, block image production unit 32 to divide the input image into predetermined number of blocks, image feature quantity processing unit 33 for a block image, separating hyperplane processing unit 34 to compute separating hyperplane according to training data, category determination unit 35 to determine the category that a block belongs to according to the image feature quantity and separating hyperplane data of input image, block images grouping unit 36 to group together categorized blocks into groupings, consistency checking unit 37 to ensure that there are no contradictions within categories according to their locations for each block or group of blocks, and output unit 38 to output the block or group information for each block. Unit 31 through unit 38 can be executed by a program as a CPU process (step).

<1. Separating Hyperplane Production Process Using Training Data>

Firstly, training data are input into discriminator 10. Training data are image blocks labeled with correct categories.

In addition to the above 6 landscape subject categories, 3 categories are included which are man-made object, black, and white. This is done in order to avoid situations such as being forced to classify a non-landscape subject image into a category. Adding these categories, in sense passive, the process will improve the accuracy of landscape subject category classification which is its true aim. Passive categories are not restricted to the examples above, and can be configured as desired. Also, all passive categories can be treated as a single non-landscape subject category.

Inputted training data are stored in training data storage area 22 of memory device 20 via image data input unit 31.

Then, image feature quantity processing unit 33 computes the image feature quantity data for each block image of training data.

Below is the explanation for obtaining image feature quantity data.

(Obtaining Image Feature Quantity)

(1) Color Space Information

Color space used is the YUV color space with each of Y, U, and V having 8 intensity values within a 32 by 32 block to measure the frequency of occurrence of each value.

Standard deviation between pixels in YUV values becomes large if there is a wide variety of colors or if the distribution of colors are divided into several groups, which is effective for adding feature quantity that is useful for recognizing man-made objects.

Figure 4:
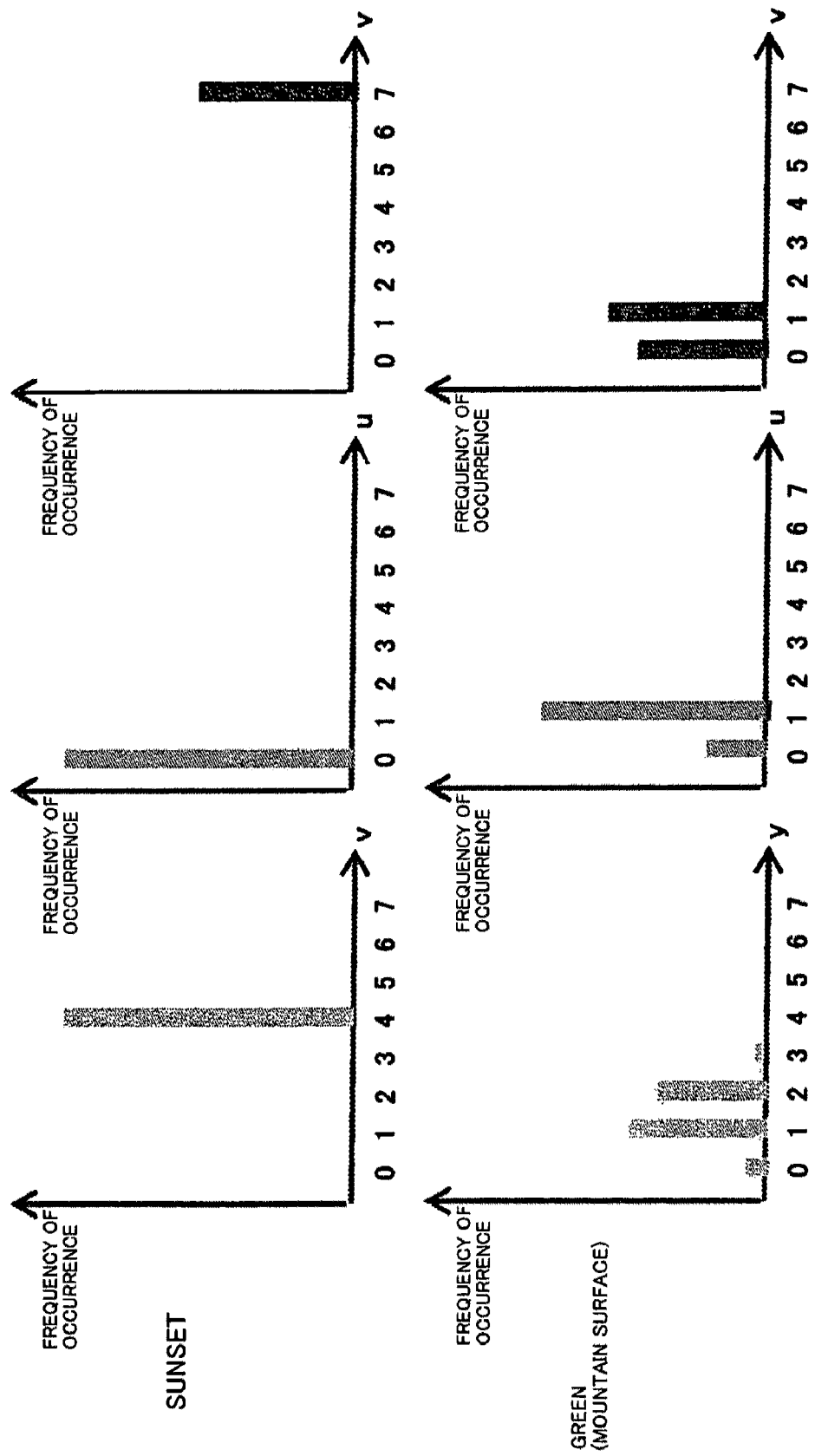
FIG. 4 is an explanatory drawing of color component process using histograms of an embodiment of this invention.

Specifically, as indicated in FIG. 4, by using a histogram with intensity along the Y-axis and grade along the X-axis where color component value 0-255 is divided into 8 clusters, their frequency of occurrence is measured. Therefore, a 21-dimensional space is created from having 7 degrees of freedom in color component intensity times 3, which equals 21 degrees of freedom.

(2) Frequency Information

Spatial frequency component analysis is effective for detecting complexity and patterns within a block. For example, when comparing a sky and a sea with similar colors, the latter generally has more high frequency components, therefore category classification can be performed using spatial frequency component in addition to color component information as its feature quantity.

Also, a mountain surface and a sea tend to be almost identical in hue and have a tendency of being high frequency components, however surface of a sea tend to contain horizontal lines created by waves, which significantly increases the frequency component in the vertical direction compared to the horizontal direction, therefore category classification can use the bias of frequency component in the horizontal or vertical direction as its feature quantity.

Specifically, the following steps will be processed for frequency information.

(S1) Divide 32 by 32 pixels block into sixteen 8 by 8 pixels small blocks.

(S2) Obtain the frequency component of each 8 by 8 small block.

(S3) Obtain and collect the 64 frequency components from each small block. The data volume can be reduced for a frequency component by methods such as arbitrary line skipping and averaging surrounding frequency components.

Frequency conversion can use Hadamard conversion or DCT conversion, they are both existing technologies.

Figure 3:
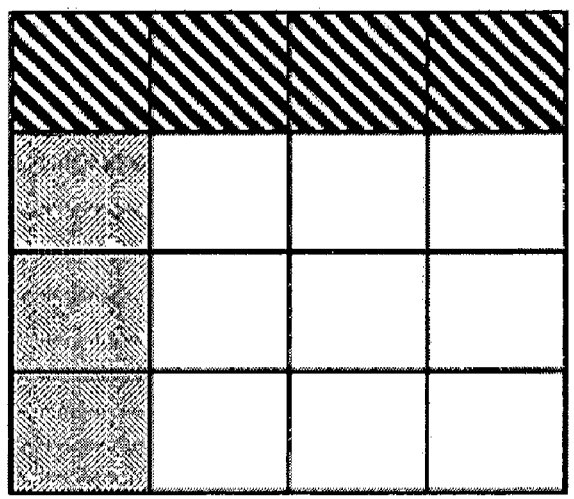
FIG. 3 is an explanatory drawing of frequency component process of an embodiment of this invention.

Next, calculation method for frequency bias is described. Frequency component consists of x-direction and y-direction frequency components, and in FIG. 3 the components with diagonal meshing are the x-direction and components in grey are the y-direction. In this embodiment, the ratio between sum of x-direction and sum of y-direction is calculated.

As a result of this computation, a distinction can be made that if the ratio is small then complexity in the x-direction and the y-direction are similar, if the ratio is large then an image is complex in one direction. For example, if a wave-like pattern is present in either direction of an image, specifically with patterns where vertical stripes are present in the y-direction the ratio of components in the x-direction will be large when compared to components in the y-direction.

Next, separating hyperplane processing unit 34 is used to obtain separating hyperplane data with image feature quantity data from the above algorithm and category information for each block of training data, then the result is stored in separating hyperplane data storage area 25.

(Obtaining Separating Hyperplane Data)

In this embodiment, the example used to describe will utilize a support vector machine (SVM).

SVM is a method that uses input training data collection to compute separating hyperplane for each category that training data belongs to, and then separates them to each category by separating hyperplane.

Separating hyperplane is computed for each category. Here, as an example a "sea" separating hyperplane computation will be described.

After obtaining predetermined number of sample images, image feature quantity processing unit 33 obtains feature quantity for each block.

At this time, each block in the training data sample image has category classifications attached to it such as "sea" and "mountain" described above. Passive category can be attached at this time as well.

Figure 5:
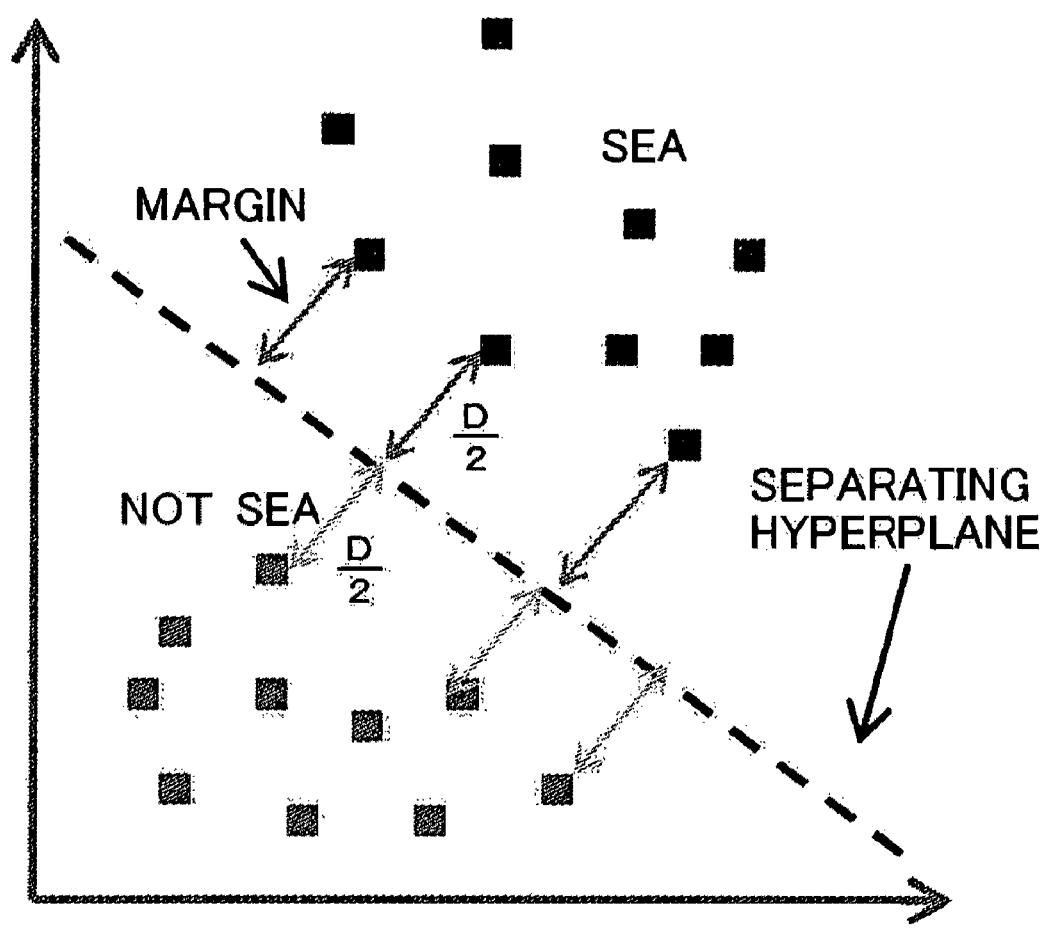
FIG. 5 is an overview diagram of the relation between feature quantity space and separating hyperplane of an embodiment of this invention.

When an SVM is learning classification of a "sea", in a d-dimensional feature quantity space, a separating hyperplane is established that divides feature quantity data areas into 2 classes, the first categorized as a "sea" and the second categorized as not "sea". If d is 2-dimensional, the separating hyperplane image is as shown in FIG. 5. Under this situation, there could be multiple separating hyperplanes, but the separating plane computed will feature farthest coordinates for the 2 classes (also known as maximizing the margin). At this time, separating plane becomes the separating hyperplane for the category "sea".

Separating hyperplane with d-dimensions of feature quantity data $X=(x_1, x_2, \ldots, x_d)$, vector=$(w_1, w_2, \ldots, w_d)$, and constant c is defined as follows.

$$w_1 x_1 + w_2 x_2 + \ldots + w_d x_d + c = 0 \quad (1)$$

When a block to be classified is input into category classification unit 35, it calculates d-dimensional feature quantity data $F=(x_1, x_2, \ldots, x_d)$ with image feature quantity processing unit 33, and then it classifies the block as belonging to a category by its distances from separating hyperplane of each category as indicated in equation (1).

Figure 6:
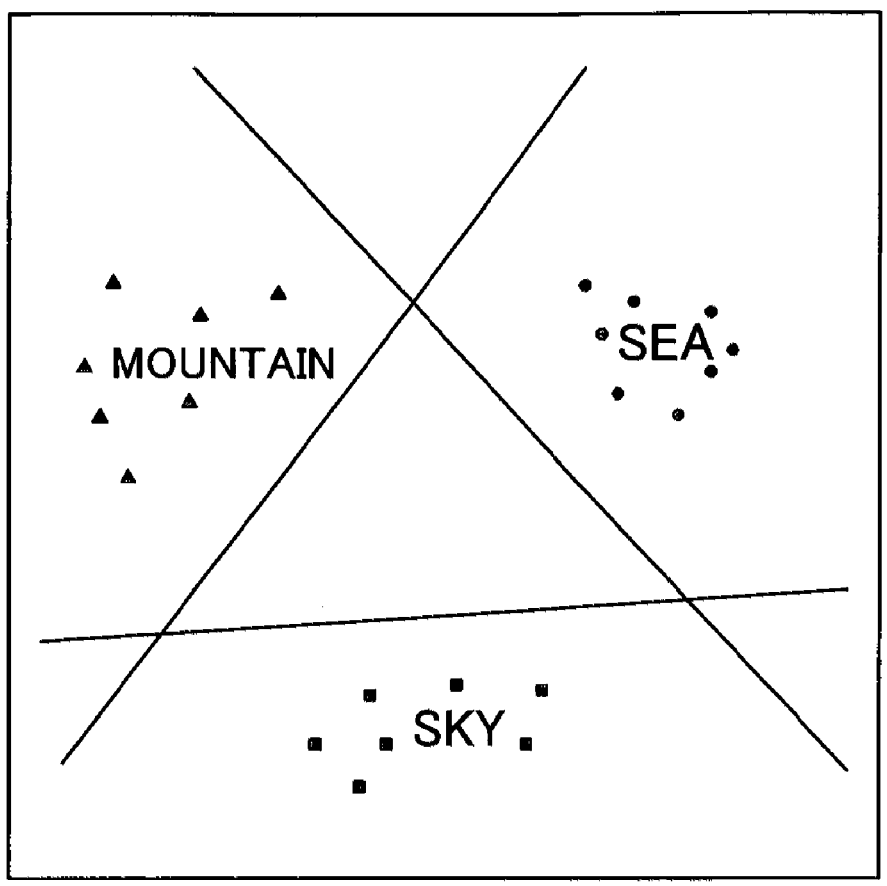
FIG. 6 is an overview diagram of separating hyperplanes for a 2-dimensional feature quantity space.

Separating hyperplane processing unit 34 obtains a separating hyperplane for each category such as with the "sea" example above, and then stores it in separating hyperplane data storage area 25. FIG. 6 treats feature quantity space as being 2-dimensional, and is an example image of separating hyperplanes after being trained on "sea", "mountain", and "sky" categories.

<2. Target Image Categorization Process>
(Image Input Process)

Input target image is stored in target image storage area 21 of memory device 20 by image data input unit 31.

(Block Partition Process)

This input image is divided into predetermined number, such as 32 by 32, of blocks by block image production unit 32, and then they are stored in block image storage area 23. Block images are associated with a source image, where only the address of each block header can be stored. Size of these blocks is the same with the block sizes in the above mentioned training data.

(Image Feature Quantity Computation Process)

Next, image feature quantity of each block is calculated by the image feature quantity processing unit 33, and the result is stored in image feature quantity data storage area 24. FIG. 7 is an example of an image feature quantity data for each block. Here, each feature quantity data is represented by $x_1$, $x_2, x_3, \ldots$.

(Category Classification Process)

Next, category classification unit 35 classifies which category a block belongs to according to the distance of image feature quantity from the separating hyperplane of each block in the input image.

Specifically, for each category, category classification unit 35 substitutes in the feature quantity data obtained from the image feature quantity computation process into the left side of the above equation (1), and then calculates the signed distance between the separating hyperplane and coordinates $(x_1, x_2, \ldots, x_d)$ in the feature quantity space and stores the result in separating hyperplane data storage area 25 (FIG. 8). Then, the category with the largest positive value for its distance is classified as the category the block belongs to, and this result is stored in result file 26. FIG. 9 is an example of a data structure of a result file. In this diagram, Block No. corresponds to a 32 by 32 pixel block image of a target image. Also, category that has been classified for each block is associated in the data.

At this time, if distance is negative to every category or if a block belongs to a passive category, then set its category to "unknown" or leave it blank to indicate that it does not belong to any category.

(Consistency Checking Process)

Next, categories of result file 26 for each block is checked and corrected by consistency checking unit 37.

Figure 10:
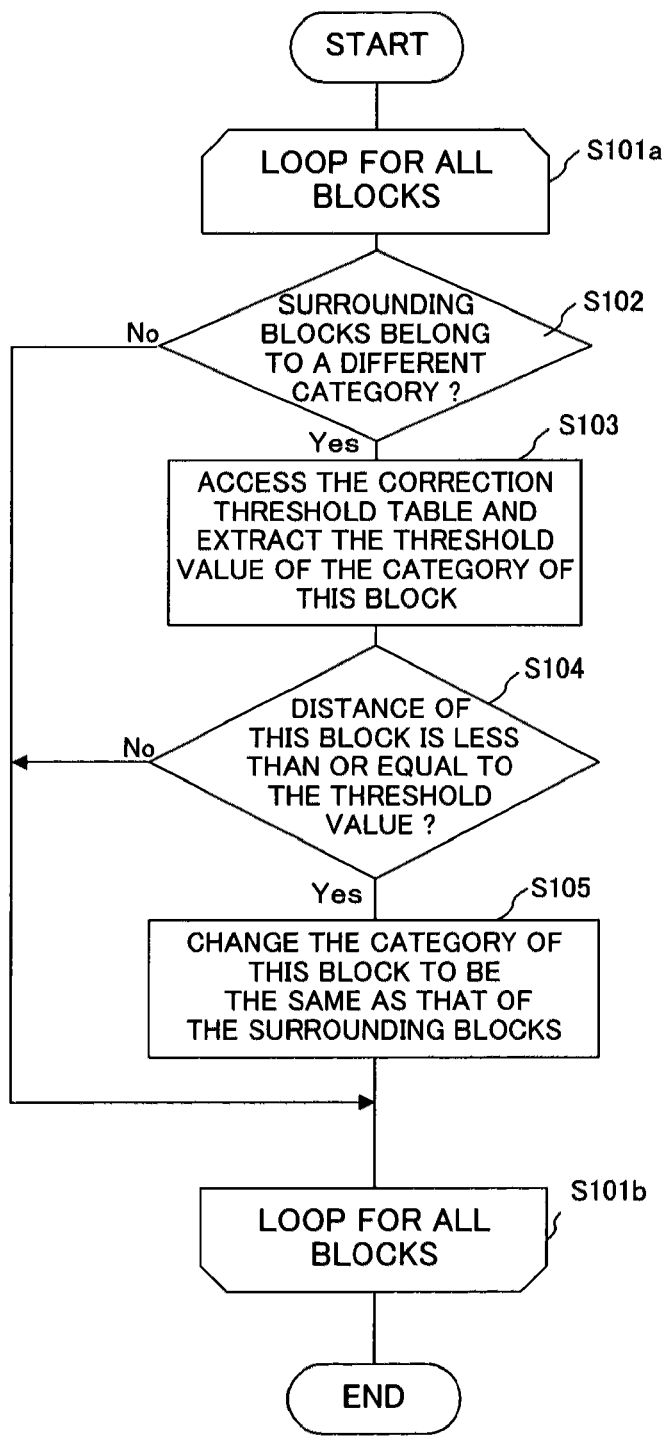
FIG. 10 is a flowchart of category correction routine for each block in consistency checking unit 37 of FIG. 2.

FIG. 10 is a flow chart indicating category correction process at the block level. Firstly, in focussing on a specific block, the process determines if a predetermined number of surrounding blocks (for example, in 3 directions) or more belong to a different category from the specific block's category (S102), if YES then accesses the correction threshold table indicated in FIG. 11 and extracts the distance from the separating hyperplane for the threshold of that category (S103). Next, the process determines if distance of specific block from separating hyperplane is above or below the extracted threshold value (S104), if it is less than or equal to threshold value, then changes the category of the specific block to be the same as that of the surrounding blocks (S105).

While performing category classification using separating hyperplane, if the distance condition is too strict, then there may be more instances of what should truly belong to a category not being classified as appropriately. On the other hand, if conditions are too loose, then a tendency of misclassifying categories becomes stronger. A practical value of the consistency checking threshold can be set by configuring it appropriately.

Figures 11, 12:
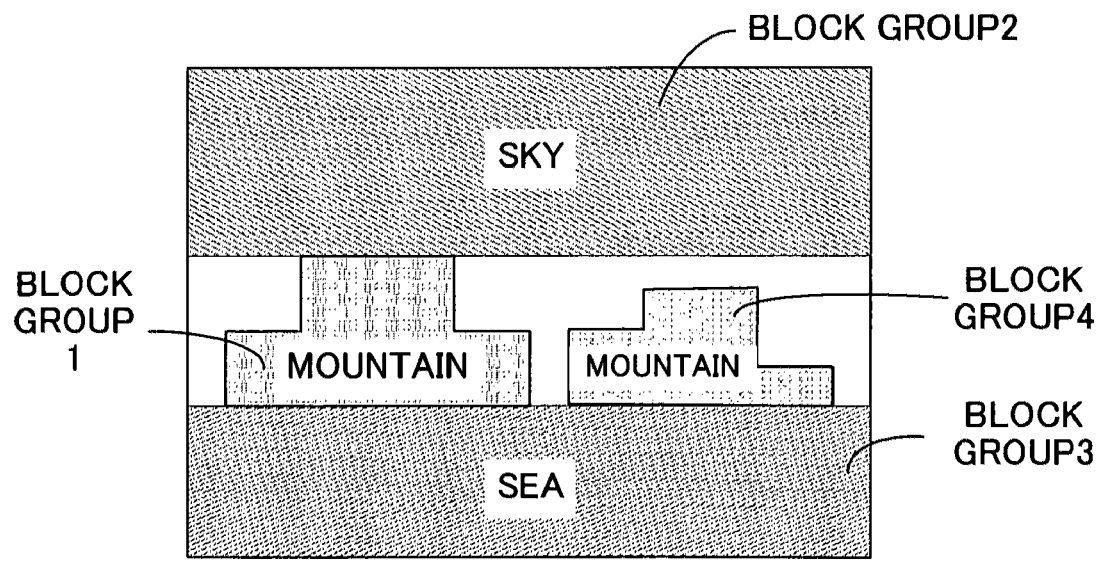
FIG. 11 is a data structure example for a correction threshold table used in FIG. 10.
FIG. 12 is an overview diagram displaying relational locations of each block group in the image of FIG. 9.

After correcting categories for each block, grouping unit 36 groups together surrounding blocks of the same category to form a group of blocks (FIG. 9 and FIG. 12). Further, consistency checking unit 37 determines whether there are any contradictions in this group of blocks and stores the result.

Figure 13:
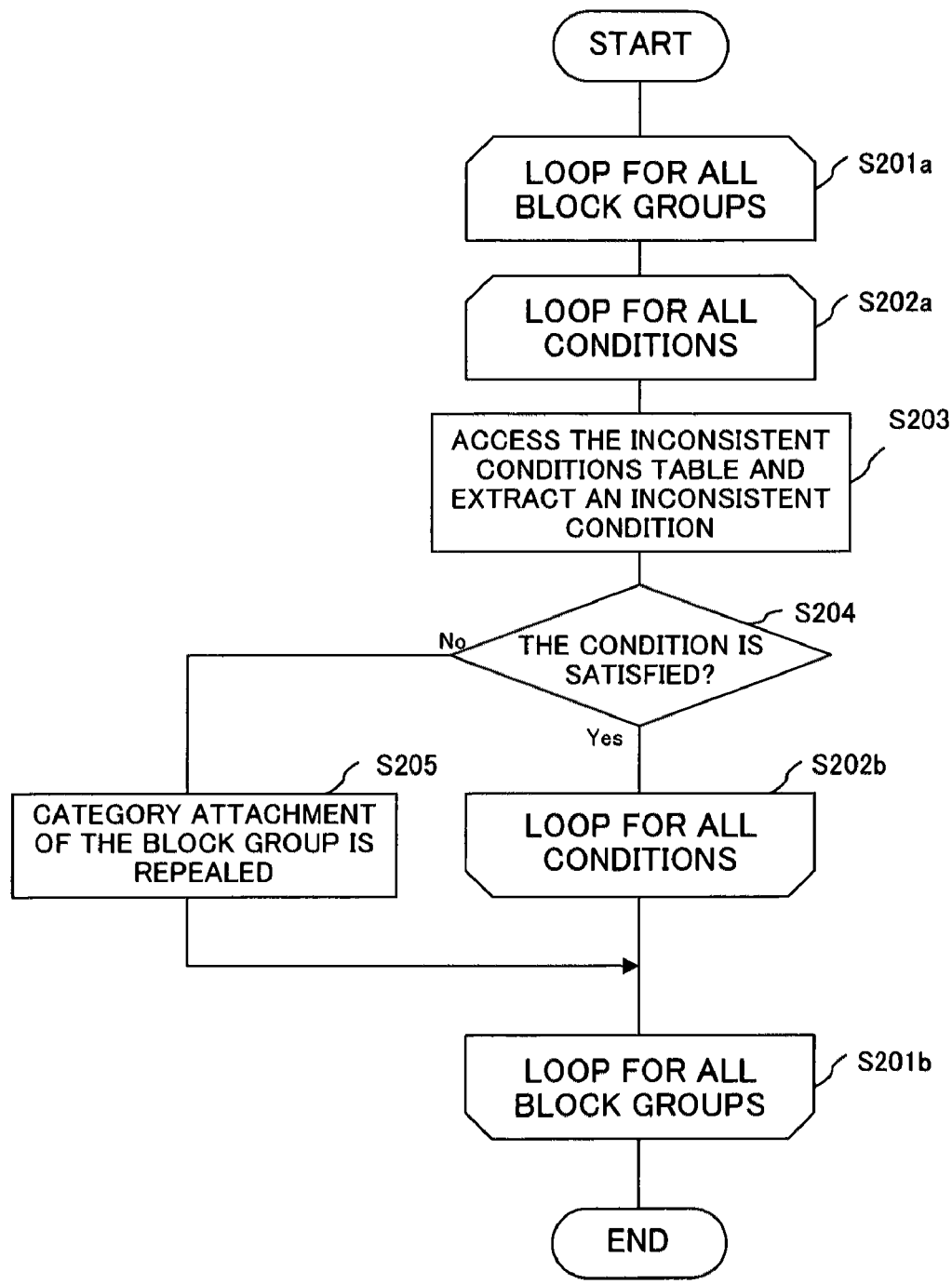
FIG. 13 is a flowchart indicating block group consistency determination routine for consistency check unit 37 of FIG. 2.

FIG. 13 is a flow chart indicating the block group consistency determination process conducted by consistency checking unit 37.

For a specific block group, the process accesses the inconsistent conditions table and for each inconsistent condition determines whether that condition is satisfied or not. FIG. 14 indicates inconsistent conditions. In this diagram, inconsistent condition consists of inclusive condition and vertical location condition, therefore for example condition no. 1 "sea", there is no instance that "sky" will be included in "sea," and if category "sea" blocks surround a category "sky" block, then that indicates that there was a category classification error. Also for condition no. 2 "sky," if "sea" is above "sky," and "mountain" is below sky, then it will be determined as inconsistent. These conditions will be determined for each block group. As a result of this consistency check, if there is an inconsistent part, then this inconsistent part can be output as a message, or a correction process is performed for blocks on the border of groups by using their distance from separating hyperplanes or by matching the inconsistent part to a category with the larger difference between with its threshold table value. Also, an entire group of blocks can be determined to be invalid if the number of blocks belonging to a category is below or equal to the predetermined number of set for that category.

And category information of this target image and determination result is output by output unit 38.

According to this embodiment of the present invention, very accurate classification is made possible due to the creation of multiple layers according to intensity of block image color space, and for each layer the image feature quantity consists of frequency of occurrence, standard deviation between pixels, frequency component indicating change in brightness, and frequency component bias within the block.

Figure 15:
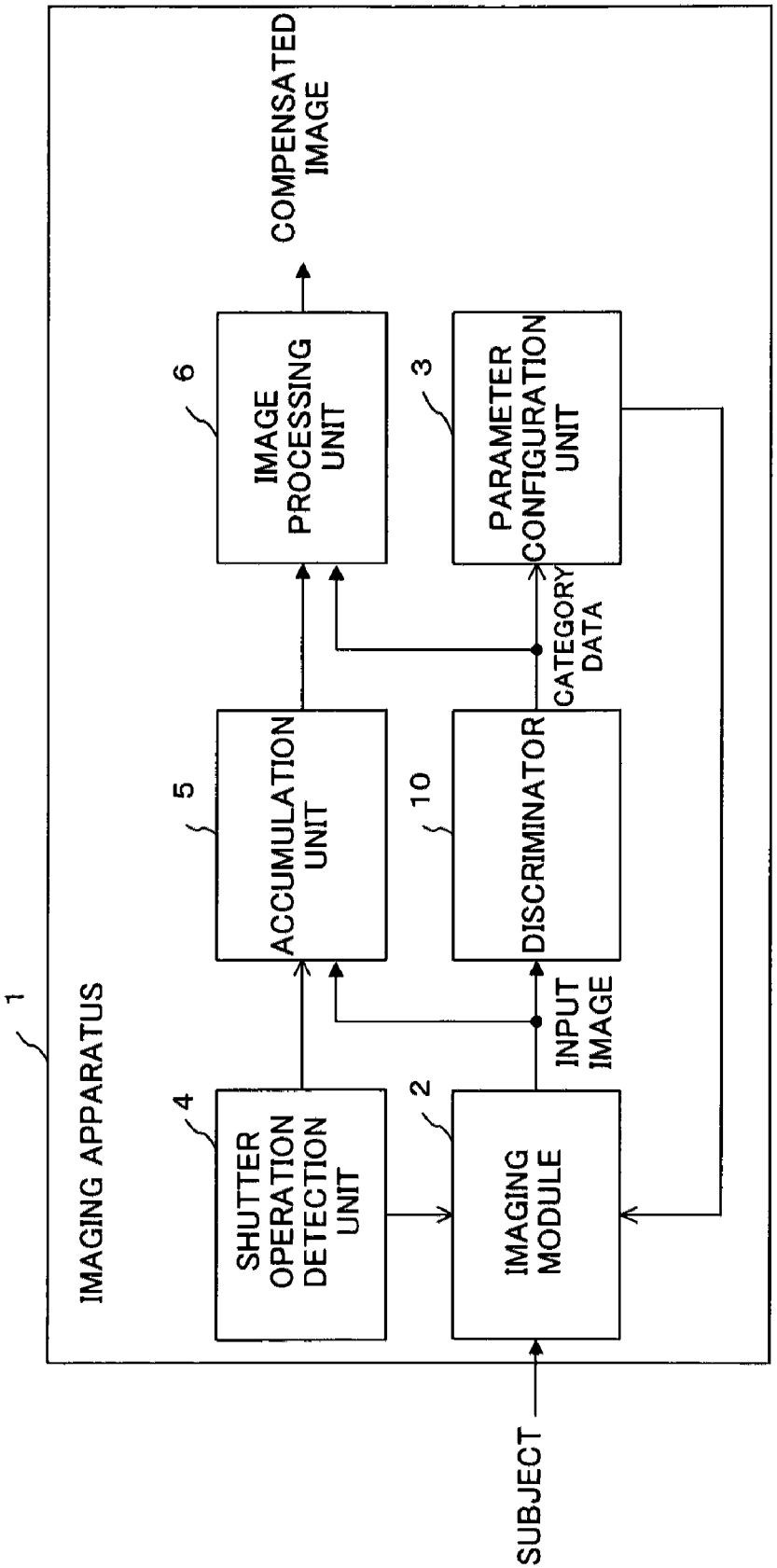
FIG. 15 is a block diagram of the imaging apparatus for the second embodiment of this invention.

A second embodiment of the present invention is described here. FIG. 15 is a block diagram where discriminator 10 of FIG. 2 is embedded. In this diagram, imaging apparatus 1 includes imaging module 2 to create image signal of subject, shutter operation detection unit 4 to output image accumulation command by detection shutter operation, accumulation unit 5 to accumulate image signals output by imaging module 2 upon receiving image accumulation command from shutter operation detection unit 4, image processing unit 6 to compensate the accumulated image data, discriminator 10, and parameter configuration unit 3 to set the parameters of imaging module 2 based on category data output by discriminator 10.

Here, discriminator 10 shares the basic configuration described in FIG. 2, however when embedding into imaging apparatus 1, an independently calculated separating hyperplane data is stored in advance, therefore separating hyperplane processing unit 34 can be removed.

Operation of imaging apparatus 1 with above configuration is described below. Image signal output from preview mode of imaging module 2 before shutter operation is input into discriminator 10. Discriminator 10 performs actions described in the first embodiment to this image signal and outputs a category that corresponds to image block group. Parameter configuration unit 3 contains categories and their associated parameters as indicated in FIG. 16, and this table is referenced to set shutter speed, exposure time, and other mode settings of imaging module 2.

Next, shutter operation detection unit 4 upon detecting shutter operation then notifies imaging module 2 of that timing, while image signal output from imaging module 2 is accumulated in accumulation unit 5. This accumulated image data is read in by image processing unit 6, and then appropriate image compensation process is executed according to the compensation process table in FIG. 17 where compensation process is associated with a category and the category data for the image is output by discriminator 10.

According to this embodiment of the present invention, high quality image can be created without having the user configure complicated imaging apparatus parameters because the category classification result obtained from preview image data is used to configure imaging apparatus parameters, and after image is captured the image is processed according to the category.

The present invention can take on various embodiments that are not beyond the scope of this invention. For example, in the above embodiment, landscape subjects were used as an example, however it is apparent that the subjects do not have to be restricted to landscapes and can also include other categories such as persons and man-made objects.

Figure 18:
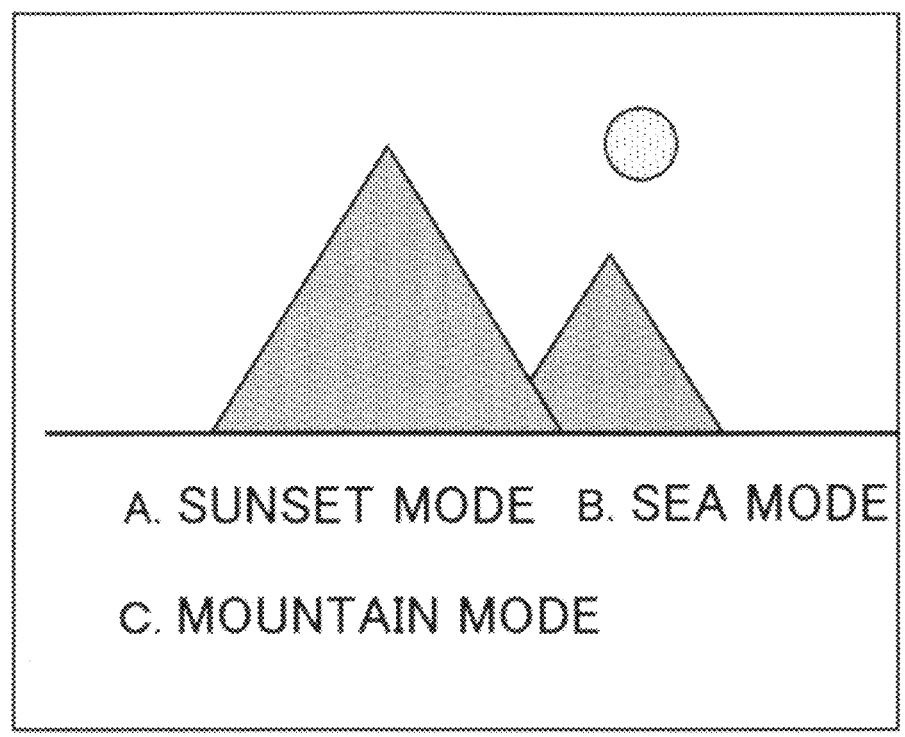
FIG. 18 is an example drawing of image capture mode selection screen displayed on an LCD monitor of an imaging apparatus.

Also, as indicated in FIG. 18, system can let user select from a list of image capturing modes that a user is likely to use that are provided according to the recognized landscape subject. Performing parameter configuration and image processing for the selected mode allows for production of a high quality image according to the user's wish.

Figure 19:
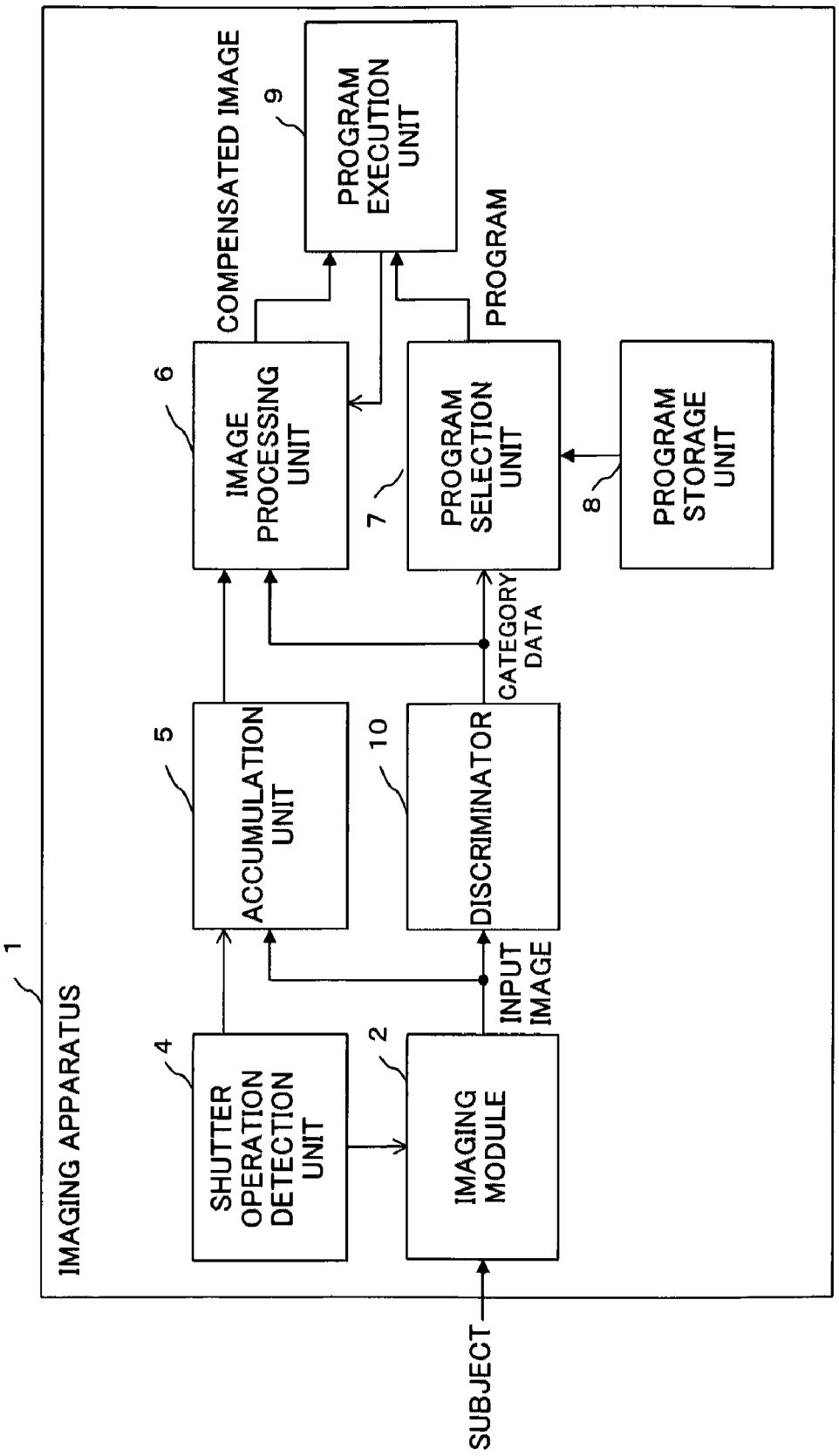
FIG. 19 is a block diagram of the imaging apparatus for the third embodiment of this invention.

A third embodiment of the present invention is described here. FIG. 19 is the block diagram of the imaging apparatus of this embodiment. The difference from FIG. 15 is that there is no parameter configuring unit 3 and instead it includes program storage unit 8 to store programs that are attached to categories, program selection unit 7 to input a category as classified by discriminator 10 and select the appropriate program from program storage unit 8 that is attached to that category, and program execution unit 9 to execute the program that was selected by program selection unit 7.

Operation of imaging apparatus 1 is described below based on the example in FIG. 20 with 2D barcode 50 printed on a business card.

Firstly, discriminator 10 is trained with training data from the 2D barcode by using the method as described in the first embodiment, and the resulting separating hyperplane data is stored.

By using this imaging apparatus 1 to capture the business card with the 2D barcode, the image signal of the business card output from imaging module 2 is input into discriminator 10. Discriminator 10 executes operations described in the first embodiment onto this business card image and outputs categories for each image block. Discriminator 10 is equipped with the separating hyperplane of the 2D barcode, so in this case part A of FIG. 20(b) with the bold outline is recognized as the 2D barcode category, thus outputting category information and block groups.

Program selection unit 7 receives this category data as input, selects a 2D barcode reading program that is stored in program storage unit 8, then passes it to program execution unit 9. Then, program execution unit 9 starts up the 2D barcode reading program passed to it from program selection unit 7.

After starting up, the 2D barcode reading program configures the imaging unit to macro mode where the focus distance is close, and then requests the 2D barcode area image data from image processing unit 6. Image processing unit 6 determines whether the input image is a 2D barcode, and 2D barcode area image is passed to program execution unit 9. Program execution unit 9 executes 2D barcode reading program, thereby processing the 2D barcode image, then outputs the result with information contained in the barcode.

Therefore, process of imaging apparatus 1 reading a 2D barcode was described, but if there is an appropriate program for another category, then a similar operation is possible.

If an OCR program is being stored and attached to text information category, then discriminator 10 can recognize part B of FIG. 20(b) as text information, start up the OCR program, then read the text information contained in part B.

According to this embodiment, categories and programs are stored by linking them together, and then an appropriate program is executed depending on the output category data from the discriminator which improves operation. Further, program processing accuracy can be improved by interlocking with the image processing unit compensation process.

What is claimed is:

1. An image identification method, comprising steps of:
   learning separating hyperplanes respectively indicating boundaries of each category by reading a training data image including a plurality of blocks of the training data image to each of which a category is labeled and calculating image feature quantity of each of the plurality of blocks of the training data image;
   dividing a newly acquired image into a plurality of blocks to produce a plurality of block images;
   calculating the image feature quantity of each of the plurality of block images of the newly acquired image by its color space information and frequency component;
   determining a category for each of the plurality of block images of the newly acquired image based on a distance of the image feature quantity from the separating hyperplane of each category;
   grouping neighboring blocks of the same category together to form a group of blocks; and
   checking whether the determined category for each of the groups of blocks meets inconsistent condition for judging inconsistency of physical relationship between categories stored in an inconsistent condition table or not, based on physical relationship between a targeted group of blocks and other group of blocks surrounding the targeted group of blocks and for which other category is determined.

2. The image identification method according to claim 1, further comprising a step of:
   outputting a result of the step of checking whether the determined category for each of the groups of blocks meets the inconsistent condition or not as a message.

3. The image identification method according to claim 1 or 2, further comprising steps of:

checking whether a predetermined number or more of surrounding blocks belong to a different category from that of each of the blocks or not, and changing the determined category of each of the blocks to the different category when the predetermined number or more of the surrounding blocks belong to the different category.

4. The image identification method according to claim 1 or 2, further comprising a step of:

determining the determined category for each of the groups of blocks to be invalid when the number of blocks included in each of the groups is below or equal to a predetermined number previously set for the category.

5. An imaging apparatus which identifies image category by implementing the image identification method according to claim 1 or 2, comprising:

an imaging condition storage means for memorizing the parameters for each category of the imaging apparatus and image processing methods after capturing the image;

an imaging means for setting parameters of the imaging apparatus according to the category of subject output by the image identification method when capturing an image, and acquiring a captured image;

and an image processing means for executing image processing by image processing methods corresponding to the category of the captured image.

6. An imaging apparatus which identifies image category by implementing the image identification method according to claim 1 or 2, comprising:

a program storage means for storing programs that are to be executed with relation to a category;

a program selection means for selecting a program related to the category identified by the image identification method if the program storage means is storing the program; and a program execution means for executing the program selected by the program selection means.

\* \* \* \* \*